US010282117B2

(12) United States Patent
Benkert et al.

(10) Patent No.: US 10,282,117 B2
(45) Date of Patent: *May 7, 2019

(54) DEVICE CONTROLLER AND METHOD OF ENFORCING TIME BASED SECTOR LEVEL SECURITY

(71) Applicants: John Edward Benkert, Labelle, FL (US); Tony Edward Fessel, Fort Myers, FL (US)

(72) Inventors: John Edward Benkert, Labelle, FL (US); Tony Edward Fessel, Fort Myers, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/118,683

(22) Filed: Aug. 31, 2018

(65) Prior Publication Data

US 2018/0373448 A1    Dec. 27, 2018

Related U.S. Application Data

(63) Continuation of application No. 15/150,860, filed on May 10, 2016, now Pat. No. 10,095,431.

(51) Int. Cl.
*G06F 3/06* (2006.01)
*G06F 21/72* (2013.01)
*G06F 21/32* (2013.01)

(52) U.S. Cl.
CPC .......... *G06F 3/0622* (2013.01); *G06F 3/0653* (2013.01); *G06F 3/0659* (2013.01); *G06F 3/0673* (2013.01); *G06F 21/32* (2013.01); *G06F 21/725* (2013.01)

(58) Field of Classification Search
CPC .... G06F 3/0622; G06F 3/0653; G06F 3/0659; G06F 21/725; G06F 21/32
See application file for complete search history.

(56) References Cited

U.S. PATENT DOCUMENTS

| 6,215,405 | B1 * | 4/2001 | Handley | G08B 17/06 |
| | | | | 340/521 |
| 7,973,607 | B1 * | 7/2011 | Ciaffi | G06F 21/725 |
| | | | | 331/16 |
| 8,688,588 | B2 * | 4/2014 | Holtzman | G06F 21/10 |
| | | | | 705/59 |
| 8,688,924 | B2 * | 4/2014 | Holtzman | G06F 21/10 |
| | | | | 700/306 |
| 8,869,288 | B2 * | 10/2014 | Conley | G06F 21/10 |
| | | | | 705/51 |
| 9,817,610 | B1 * | 11/2017 | Shallal | G06F 11/14 |
| 2002/0171546 | A1 * | 11/2002 | Evans | G06F 21/554 |
| | | | | 340/540 |
| 2004/0089717 | A1 * | 5/2004 | Harari | G06F 13/387 |
| | | | | 235/441 |

(Continued)

*Primary Examiner* — Nelson Giddins
(74) *Attorney, Agent, or Firm* — George F. Wallace

(57) ABSTRACT

A device controller interfaced between an electronic processing device and a sector-based data storage device, includes a processor connected to a clock, and a computer memory having a control list stored therein. A control list includes a security feature entry having a target sector range, time data associated with the target sector range, and at least one security response associated with the target sector range. The processor determines, based at least in part on interrogation of the control list and a clock time, the time data of the entry conflicts with the clock time, and executes the at least one security response.

20 Claims, 6 Drawing Sheets

(56) References Cited

U.S. PATENT DOCUMENTS

| | | | | |
|---|---|---|---|---|
| 2005/0276092 | A1* | 12/2005 | Hansen | G06F 3/0626 |
| | | | | 365/149 |
| 2006/0248596 | A1* | 11/2006 | Jain | G06F 21/10 |
| | | | | 726/27 |
| 2008/0099570 | A1* | 5/2008 | Krebs | F23N 5/203 |
| | | | | 236/46 R |
| 2008/0168247 | A1* | 7/2008 | Goodwill | G06F 21/6218 |
| | | | | 711/163 |
| 2009/0191919 | A1* | 7/2009 | Kawamura | G06K 19/07 |
| | | | | 455/558 |
| 2010/0061152 | A1* | 3/2010 | De Caro | G11C 7/1045 |
| | | | | 365/185.18 |
| 2013/0024734 | A1* | 1/2013 | Katsuragi | G06F 3/0611 |
| | | | | 714/55 |
| 2014/0247131 | A1* | 9/2014 | Bunker | G06F 3/0605 |
| | | | | 340/691.6 |
| 2014/0365714 | A1* | 12/2014 | Sweere | G06F 12/0246 |
| | | | | 711/103 |
| 2015/0039806 | A1* | 2/2015 | Green | G06F 3/0614 |
| | | | | 711/103 |
| 2015/0105868 | A1* | 4/2015 | Sin | G05B 19/05 |
| | | | | 700/7 |
| 2015/0293830 | A1* | 10/2015 | Bhide | G06F 9/45533 |
| | | | | 718/1 |
| 2015/0319352 | A1* | 11/2015 | Donovan | G08B 13/19645 |
| | | | | 348/159 |
| 2016/0188023 | A1* | 6/2016 | Chang | G06K 9/00013 |
| | | | | 345/173 |
| 2016/0210047 | A1* | 7/2016 | Kobayashi | G06F 3/061 |
| 2017/0154181 | A1* | 6/2017 | Venkataramani | G06F 21/556 |
| 2018/0018097 | A1* | 1/2018 | Kazakov | G06F 3/0605 |

* cited by examiner

DEVICE CONTROLLER AND METHOD OF ENFORCING TIME BASED SECTOR LEVEL SECURITY

RELATED DOCUMENTS

This document is related to U.S. patent application Ser. No. 16/118,695, entitled "Device Controller and Method of Enforcing Time Based High Level Data Characteristics," and filed on Aug. 31, 2018 by John Edward Benkert and Tony Edward Fessel; and also, is related to, claims the priority benefit of, and incorporates by reference in its entirety, U.S. patent application Ser. No. 15/150,860, entitled "Device Controller and Method of Enforcing Time-Based Sector Level Security," and filed on May 10, 2016 by John Edward Benkert and Tony Edward Fessel, which in turn claims the priority benefit of, and incorporates in its entirety Provisional Patent Application Ser. No. 62/181,591, entitled "Device Controller and System with Sector Level Security," and filed on Jun. 18, 2015 by John Edward Benkert and Tony Edward Fessel.

FIELD OF THE INVENTION

The present invention relates to device controllers, and more specifically, to data security and coherency.

BACKGROUND OF THE INVENTION

A device controller can interface between a computer processing device and one or more memory devices. A computer processing device, such as a computer, can issue memory read and write requests to such a device controller, which can effectuate the requests by facilitating the reading from and writing to the one or more memory devices.

SUMMARY OF THE INVENTION

An object of the present invention to provide a device controller to enforce security.

It is another object of the present invention to provide corresponding methods of enforcing time-based sector level security.

In an exemplary embodiment, the present invention can include a device controller interfaced between an electronic processing device and a sector based data storage device, with the device controller including at least one processor communicatively connected to a clock and to at least one computer memory having a control list stored therein.

In an exemplary aspect, a control list can include one or more security feature entries, with each security feature entry respectively including a target sector range, time data associated with the target sector range, and at least one security response associated with the target sector range.

In another exemplary aspect, for a particular one of the one or more security feature entries, the at least one processor can determine, based at least in part on interrogation of the control list and a clock time generated by the clock, the time data of the particular entry conflicts with the clock time, and in response to such determination, can thereafter execute the at least one security response of the particular entry.

According to an exemplary embodiment of the invention, time data can represent an expiration date and the at least one processor can determine the time data conflicts with the clock time if the clock time is beyond the expiration date.

In an exemplary aspect of any embodiment of the present invention, the at least one processor can render a time conflict determination in response to a processing request received from an electronic processing device, in response to an alarm interrupt received from an optional event monitoring system communicatively connected to the at least one processor, or in response to any desired logical condition or state, including but not limited to the former two cases.

In another exemplary aspect of the present invention, the at least one security response associated with the particular entry can include at least one of a write access denial, a read access denial, an existing data encryption, an existing data deletion, an existing data wipe, an existing data relocation, and log event generation.

In another exemplary embodiment of the present invention, time data can represent a time window, and the at least one processor can determine the time data conflicts with the clock time if the time data is within the time window.

In an optional exemplary aspect, the at least one processor can determine the time data conflicts with the clock time after confirming a DKA check flag is true.

In another optional exemplary aspect, the at least one processor can determine, after a wait state, that the time data conflicts with the clock time.

In still another optional exemplary aspect, the at least one processor can determine the time data conflicts with the clock time in response to receipt, from the electronic processing device, of a processing request involving the storage device.

In yet another optional exemplary aspect, the at least one processor can be communicatively connected to an event monitoring system and can determine the time data conflicts with the clock time in response to an alarm interrupt received from the event monitoring system.

In additional exemplary embodiments, the present invention provides corresponding methods of enforcing time-based sector level security.

DETAILED DESCRIPTION

Figure 1:
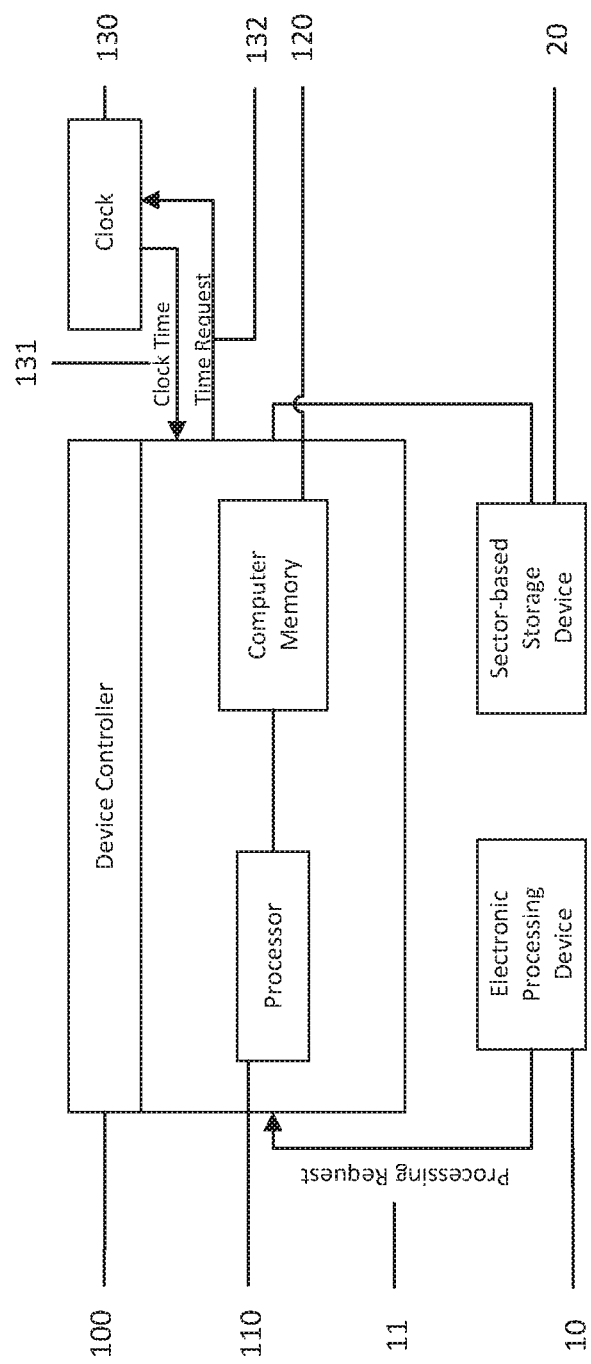
FIG. 1 illustrates an exemplary embodiment of the present invention, in which a device controller interfaced between an electronic processing device and a sector based storage device can include a processor and a computer memory, and can be communicatively connected to a clock.

It should be noted that this disclosure includes a plurality of embodiments, each having a plurality of elements, steps, and/or aspects, and such elements, steps, and/or aspects need not necessarily be interpreted as being conjunctively required by one or more embodiments of the present invention. Rather, all combinations of all elements, steps, and/or aspects described herein can enable a separate embodiment of the present invention, which may be claimed with particularity in the present or one or more future filed Non-Provisional Patent Applications. Moreover, any particular structure, arrangement, step, and/or functional logic disclosed herein, whether expressly or implicitly, are to be construed strictly as illustrative and enabling, and not necessarily limiting. Therefore, it is expressly set forth that such structure, step, arrangement, and functional logic, independently or in any combination thereof, are merely illustratively representative of one or more elements, steps, and/or aspects of one or more embodiments of the present invention and are not to be construed as necessary in a strict sense.

Further, to the extent the same element, step, or aspect is defined differently anywhere within this disclosure, whether expressly or implicitly, or individually or in combination with any another element, step, or aspect, the broader definition is to take absolute precedence, with the distinctions encompassed by the narrower definition to be strictly construed as optional.

Moreover, required hardware elements for each embodiment described herein are to be perceived in a minimalistic manner. Accordingly, one of ordinary skill in the art is directed to interpret the required hardware for each embodiment as the minimum hardware elements required to effectuate each respective security feature, with any additional hardware illustratively shown and/or described conjunctively herein as being strictly optional for that respective embodiment.

Illustratively, perceived benefits of the present invention can include functional utility, whether expressly or implicitly stated herein, or apparent herefrom. However, it is expressly set forth that these benefits are not intended as exclusive. Therefore, any explicit, implicit, or apparent benefit from the disclosure herein is expressly deemed as applicable to the present invention. Exemplary functional utility provided by a device controller disclosed herein includes enforcement of at least one feature of the security feature set described herein, and can include any additional or alternative utility apparent herefrom.

The present invention can be embodied in a device controller and a method that enforce sector level security between an electronic processing device (such as a computer or other functionally compatible device, for example and not in limitation) and a sector based storage device (such as a disk drive, a solid state drive, or any other type of sector based storage structure, for example and not in limitation).

The present invention allows user, factory, and/or default configurations to define and apply particular security features to particular sector ranges within a sector based storage device.

As illustrated in FIG. 1, according to the present invention, an exemplary device controller 100 can be interfaced between an electronic processing device 10 and a sector based storage device 20, can include at least one processor 110 (sometimes, "processor") and at least one computer memory 120 (sometimes, "computer memory"), and further, can be communicatively connected to a clock 130.

In an exemplary aspect, the present invention contemplates utilization of any type and number of processors 110 desired, insofar as functionally compatible with the present invention, including but not limited to, an Application-Specific Integrated Circuit ("ASIC"), a Field-Programmable Gate Array ("FPGA"), a general processor, etc., for example and not in limitation. Further, processing duties can be shared across multiple devices to the extent desired.

In another exemplary aspect, the present invention contemplates utilization of any type and number of computer memories 120 desired, insofar as functionally compatible, including but not limited to, a random access memory, a read-only memory, a latch, a register, sequential access memory, etc., insofar as the resulting one or more computer memories are functionally compatible with the present invention as claimed. Further, memory duties can be shared across multiple devices to the extent desired.

In another exemplary aspect, device controller 100 can be provided as any direct or indirect interfacing device between electronic processing device 10 and storage device 20 desired, such as a host controller, a memory controller, or any other known or apparent implementation of a device controller functionally compatible herewith. Further, device controller 100 can be implemented with one or more of a proprietary data interface and a "standardized" data interface, such as a Serial Advanced Technology Attachment ("SATA"), Serial Attached Small Computer System Interface ("SAS"), Small Computer System Interface ("SCSI"), Peripheral Component Interconnect Express ("PCI Express"), or Universal Serial Bus ("USB") interface, for example and not in limitation, insofar as functionally compatible.

In a further exemplary aspect, electronic processing device 10 can include a computer or any other functionally compatible device that can send data (such as a request or signal, for example and not in limitation) to device controller 100.

In another exemplary aspect, sector based storage device 20 can be provided as any type of desired data storage device that can organize stored data in a sector-based manner, such as a solid state drive, a hard drive, an optical drive, etc., for example and not in limitation.

As further illustrated in FIG. 1, clock 130 can provide a clock time 131 to processor 110. According to the present invention, clock time 131 can correspond to a current real or virtual time and/or date that represent the present real or virtual time and/or date. Notably, though illustratively shown in FIG. 1 as a device separate from device controller 100 and processor 110, clock 130 can be integrated with either to the extent desired.

In a further exemplary aspect, clock 130 can provide clock time 131 to device controller 100 according to any desired logical condition, such as, for example and not in limitation, according to a predetermined schedule (e.g., every n seconds or clock cycles, upon a scheduled event, etc.), continuously, sua sponte, or in response a logical state (e.g., in response to a time request, upon a power-up state, upon an initialization state, in conjunction with an alarm interrupt, etc.). As illustratively shown in FIG. 1, clock 130 can provide clock time 131 in response to an optional time request 132 received from device controller 100.

Figure 2A:
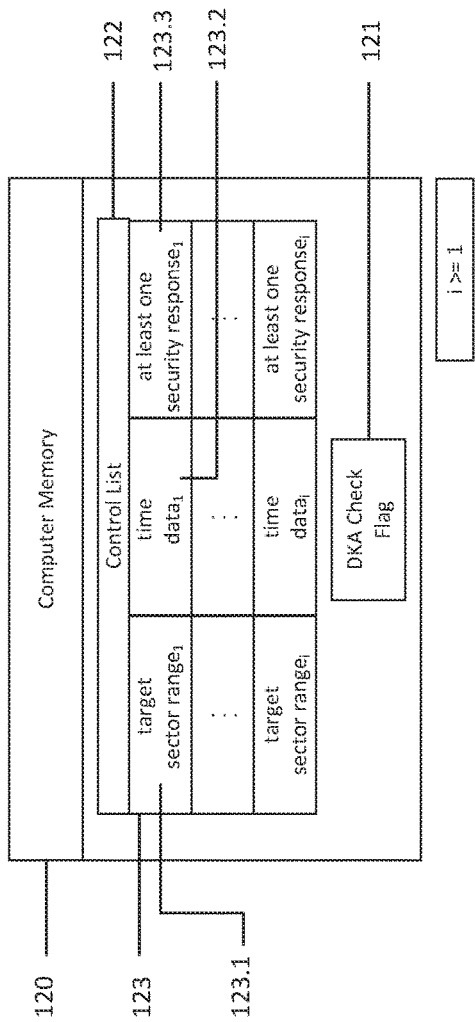
FIG. 2a illustrates an exemplary computer memory having stored therein an optional DKA check flag and an exemplary control list containing at least one security feature entry, with each entry having a target sector range, time data, and at least one security response.

As illustrated in FIG. 2a, computer memory 120 can have stored therein an exemplary optional Data Keep Alive ("DKA") check flag 121 (further discussed infra) and an exemplary control list 122 containing at least one security feature entry 123 having a target sector range 123.1 (which can be actual or determinable), time data 123.2 associated with the target sector range, and at least one security response 123.3 associated with the target sector range. Notably, a security feature entry 123, in whole or in part, can be user, default, and/or factory defined as desired.

In an exemplary aspect, target sector range 123.1 represents a range of sectors of storage device 20 that are to be acted upon if a time conflict is determined by processor 110. Such a range 123.1 can be user, default, or factory defined, and can be an actual or determinable sector range, which can be stored for subsequent use or determined dynamically, periodically, randomly, chaotically, or in response to any desired logical state or condition. Notably, such a range 123.1 can be a portion or all of available sectors ranges of a storage device 20.

In another exemplary aspect, a determinable sector range can be based upon one or more high level data characteristics, one or more of which can be used to encapsulate and define one or more sector ranges. For example and not in limitation, a high level data characteristic can be converted into one or more sector ranges at any logical state prior to use, such as during an initial configuration process, upon a conflict determination, etc. Also, for example and not in limitation, where a user specifies a file name as a high level data characteristic, the physical sector range or ranges for that file can be determined and used and/or stored as the range or ranges to be acted upon.

In a further exemplary aspect, a high-level data characteristic can represent one or more of the following: a portion of, or an entire, drive, partition, path, or directory; a file name, which can optionally include a wildcard; a time factor (such as a creation time, modified time, accessed time, etc.); a location factor (such as from where a file, directory, or partition was created, modified, accessed, etc.); file content (such as a particular data instance, which can include a wildcard, contained within one or more files); file size (such as =, <=, <. >, >=, ≠ a defined size); or any other file or data characteristic upon which one or more files or data instances can be logically referenced.

In a further exemplary aspect, an instance of time data 123.2 according to the present invention can represent an expiration date (i.e., a particular time and/or date) or a time window (i.e., a period of time), either of which can be an actual or virtual time and/or date.

Figure 2B:
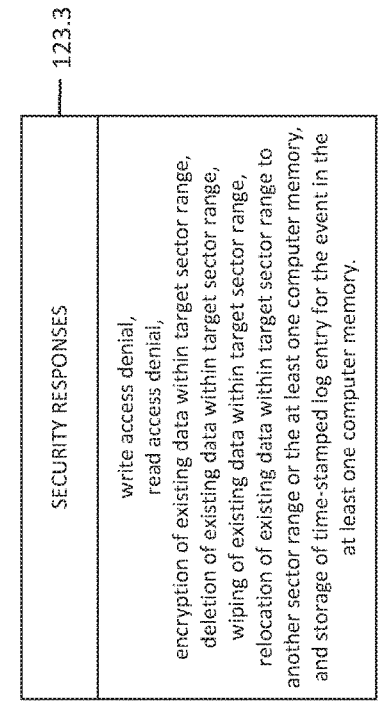
FIG. 2b illustrates exemplary security responses.

In another exemplary aspect, as illustrated in FIG. 2b, a security response 123.3 can include at least one of a write access denial (i.e., processor 110 denies write requests involving data stored within a target sector range 123.1), a read access denial (i.e., the processor denies read requests involving data stored within the target sector range), a data encryption (i.e., the processor fetches, encrypts, and overwrites the data within the target sector range with the encrypted version), an existing data deletion (i.e., the processor deletes [e.g., marks as deleted or actually deletes] data stored within the target sector range), an existing data wipe (i.e., the processor securely overwrites the data within the target sector range), an existing data relocation (i.e., the processor fetches, then stores, the data within the target sector range elsewhere, and either deletes or wipes the original data within the target sector range), and a log event generation (i.e., The processor generates and stores a log entry reflecting at least one aspect of the security enforcement, such as, for example and not in limitation, the time, cause, result, etc. of the enforcement.)

Figure 3:
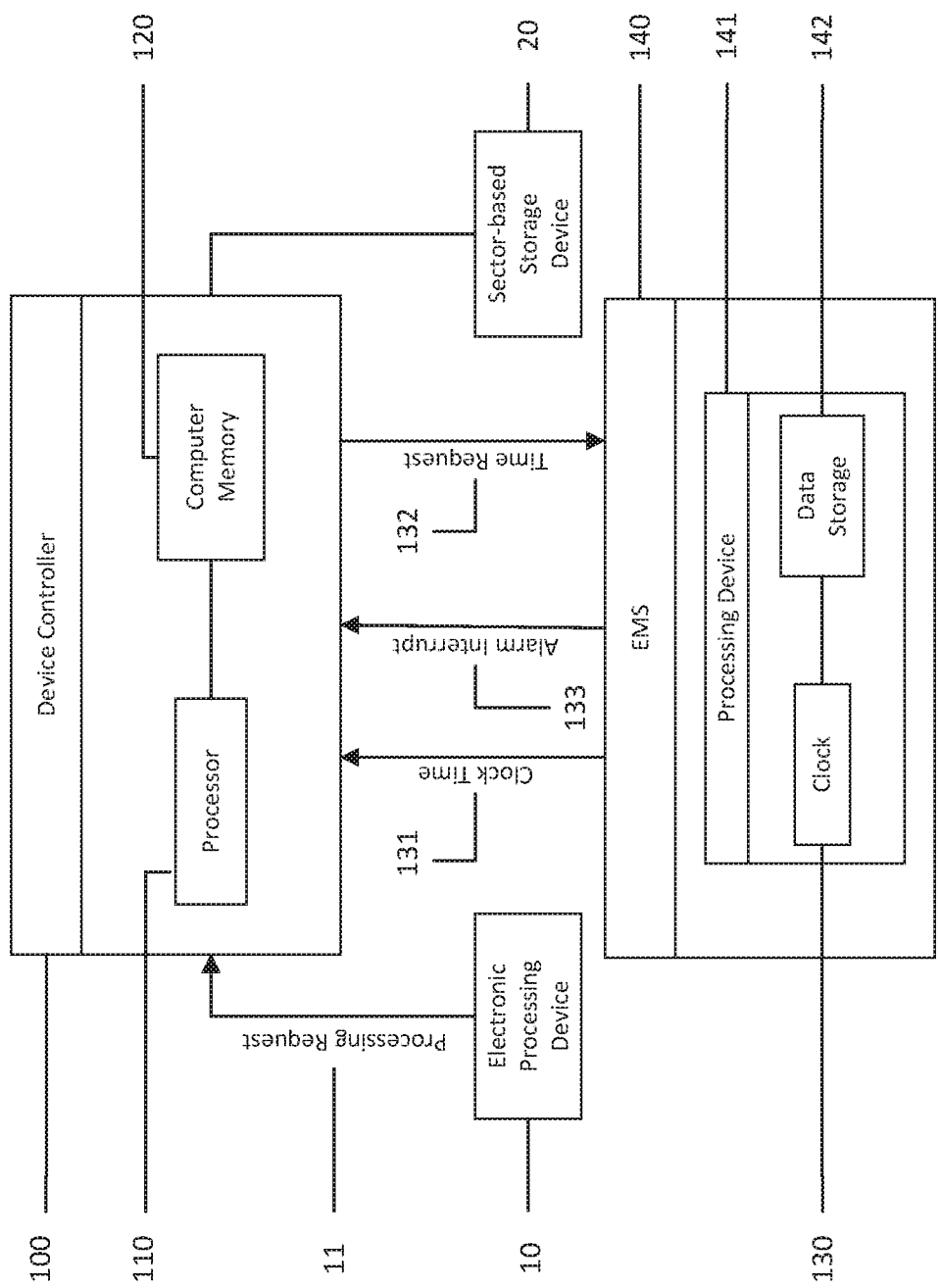
FIG. 3 illustrates another exemplary embodiment of the invention, in which a device controller interfaced between an electronic processing device and a sector based storage device can include a processor and a computer memory, and can be communicatively connected to an event monitoring system.

In still another exemplary aspect, processing load on computer processor 110 can be reduced, as illustrated in FIG. 3, via optional inclusion of an event monitoring system ("event monitor" or "EMS") 140, which can include a processing device 141 (i.e., at least one computer processor) communicatively connected to clock 130 and a data storage 142. Accordingly, a portion of enforcement duties can be carried out by EMS 140, which can increase the availability of processor 110 to execute other duties.

In another exemplary aspect, EMS 140 can include a microcontroller (such as, an MSP430, for example and not in limitation), which too can be provided as any type of functionally compatible processor or processors, and can optionally include one or more of built-in Clock-Calendar capabilities, internal non-volatile storage, a rechargeable battery system, and desired sensor interfaces.

Notably, such Clock-Calendar functionality can be external from the microcontroller as could the non-volatile storage and the battery system, to the extent desired. Clock/Calendar capabilities can also be used to generate a timestamp when a sensor event occurs and/or to provide a timestamp to the device controller 100 upon request. The microcontroller can also have alarm capabilities that can be defined to generate and issue an interrupt to device controller 100 when a programmed alarm time or event is reached or occurs, respectively.

The non-volatile storage can be used to store configuration options (such as, alarm times, sensor thresholds, etc., for example and not in limitation) and/or events (such as log sensor, alarm events, etc., for example and not in limitation) as they occur or in due course. In another exemplary aspect, log entries can be time stamped to the extent desired.

In a further exemplary aspect, various environmental sensors can be connected to the microcontroller, which can respond to interrupts generated by the sensors, or it may poll the sensors to obtain environmental measurements, such as temperatures, etc., for example and not in limitation.

In still another exemplary aspect, a rechargeable battery system can be configured to manually or automatically recharge when the device is connected to a powered host. The microcontroller and optional sensor(s) can be powered by the battery when the host system is offline, which can allow the device to log and/or respond to an event(s) even if they occur when the device is not powered, such as by a powered host, for example and not in limitation.

In an exemplary aspect, data storage 142 can be provided as any one or more types of computer memory, as defined supra, and can store one or more alarm events respectively representing target sector range 123.1 and/or time data 123.2 of at least one security feature entry 123 stored in computer memory 120. Further, in this exemplary embodiment, processing device 141 can determine based on calendar logic or otherwise interrogate data storage 142 against clock time 131 to assess whether an alarm event has arisen, or will arise, which can equate to a time conflict as further described herein. Accordingly, where such an alarm event arises, or will arise, EMS 140 can notify device controller 100 by sending an alarm interrupt 133 thereto.

According to the present invention, processor 110 can determine a time conflict exists based on the values of clock time 131 and time data 123.2. As noted above, time data 123.2 can represent an expiration date (i.e., a time and/or date) or a time window (i.e., times and/or dates). Accordingly, where time data 123.2 represents an expiration date, processor 110 can determine a time conflict exists if clock time 131 is within the time window represented by the time data, and where the time data represents a time window, processor 110 can determine a time conflict exists if the clock time is within or during the time windows represented by the time data.

Figure 4:
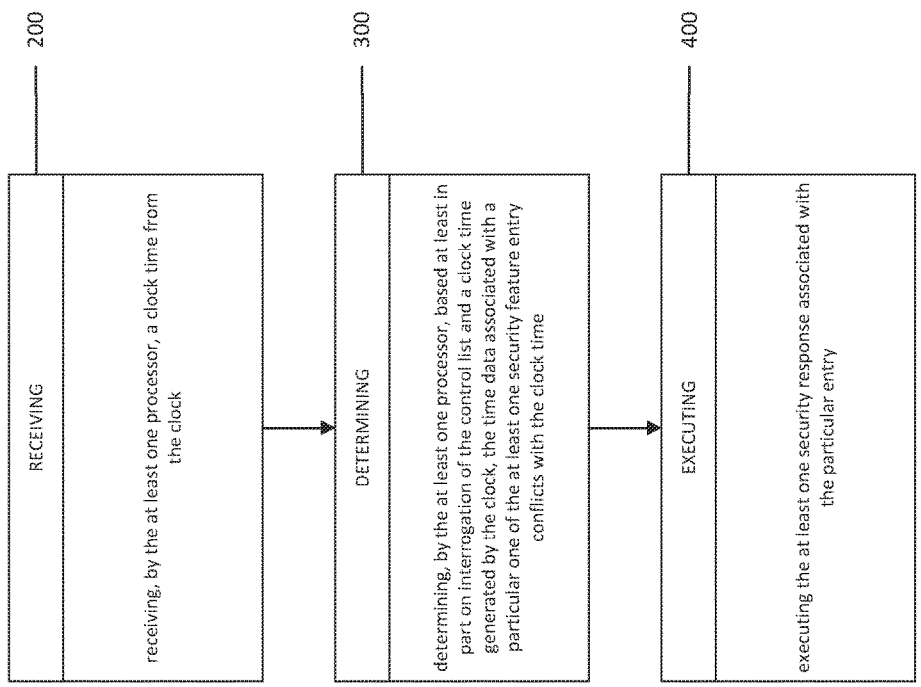
FIG. 4 illustrates an exemplary method according to the present invention, with such a method including steps of receiving, by the at least one processor, a clock time from a clock; determining, by the at least one processor, based at least in part on interrogation of a control list and a clock time, time data associated with a security feature entry conflicts with the clock time; and executing at least one security response associated with the particular entry.

As illustrated in FIG. 4, an exemplary method of enforcing sector level security can include the following: a step of receiving 200, by processor 110, a clock time 131 from clock 130; a step of determining 300, by the processor, based at least in part on interrogation of control list 122 and the clock time, the time data of a particular security feature entry 123 conflicts with the clock time; and a step of executing at least one security response 123.3 of the particular entry.

Figure 5:
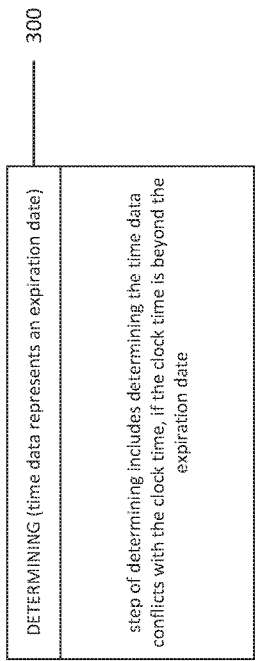
FIG. 5 illustrates an exemplary aspect of such a method, with the time data representing an expiration date, and the step of determining includes determining the time data conflicts with the clock time if the clock time is beyond the expiration date.

In an exemplary aspect, as noted above and illustrated in FIG. 5, where time data 123.2 represents an expiration date, the step of determining 300 can include determining the time data conflicts with clock time 131, if the clock time is beyond the expiration date.

Figure 6:
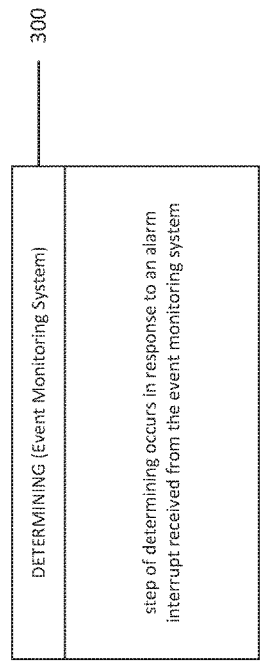
FIG. 6 illustrates another exemplary aspect of such a method, where the step of determining occurs in response to an alarm interrupt received from an event monitoring system.

As described above, the present invention can optionally include an EMS 140, in which case, as illustrated in FIG. 6, in conjunction with the optional EMS, processor 110 can execute the step of determining 300 in response to receipt by the processor of an alarm interrupt 133 from the EMS.

Figure 7:
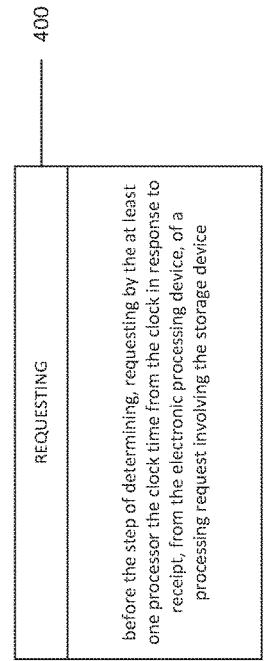
FIG. 7 illustrates an additional exemplary aspect of the invention, in which a method can further include a step of requesting, before the step of determining, by a processor the clock time from a clock in response to receipt, from an electronic processing device, of a processing request involving the storage device.

In another exemplary aspect, a method of enforcing sector level security can apply when device controller 100 receives a processing request (e.g., read request, write request, or any other request that involves storage device 20) from electronic processing device 10. Accordingly, as illustrated in FIG. 7, a method of enforcing sector-based security can optionally include the following additional step: before a step of determining 300, requesting 400, by processor 110, the clock time 131 from clock 130 in response to receipt of a processing request 11 from electronic processing device 10 involving storage device 20.

Figure 8:
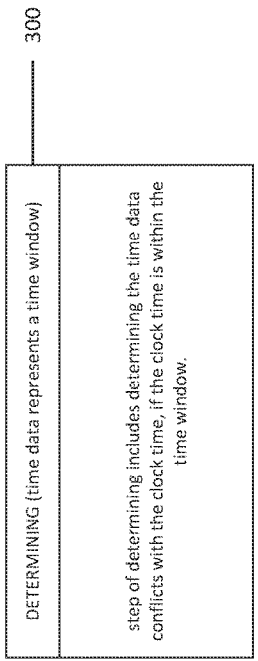
FIG. 8 illustrates still another exemplary aspect of the invention, in which time data can represent a time window, and the step of determining can include determining the time data conflicts with the clock time if the clock time is within the time window.

In an additional exemplary aspect, the present invention as noted above and illustrated in FIG. 8, where time data 123.2 represents a time window, the step of determining 300 can include determining the time data conflicts with clock time 131, if the clock time is within the time window represented by the time data.

Figure 9:
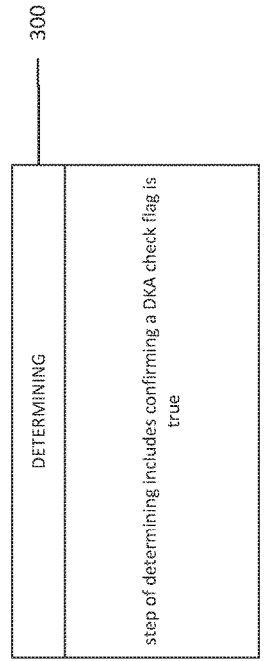
FIG. 9 illustrates a further exemplary aspect of the invention, in which a step of determining can include confirming a Data Keep Alive ("DKA") check flag is true.

In still another exemplary aspect, in conjunction with time data 123.2 representing a time window, an optional DKA check flag can be set as TRUE or FALSE, with either value being set and/or toggled by default and/or via a DKA Command, which can add an a control layer to sector level security enforcement. Accordingly, in conjunction with time data 123.2 representing a time window, as illustrated in FIG. 9, a step of determining 300 can include confirming that a DKA flag is true as a condition for processor 110 to determine the existence of a time conflict.

Figure 10:
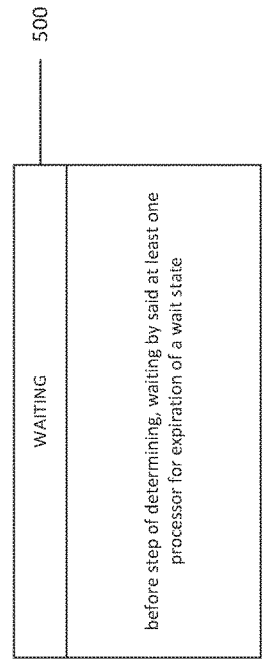
FIG. 10 illustrates still a further exemplary aspect of the invention, in which a method can further include a step of waiting, before a step of determining, by the at least one processor for expiration of a wait state.

In still yet another exemplary aspect, optionally, as illustrated in FIG. 10, a method of enforcing sector based security can additionally include a step of waiting 500 by processor 110 for the expiration of a wait state, which can be defined as a determinable amount of time, whether predefined or defined by the occurrence of any desired logical state or event (such as a user or system component based response or acknowledgement, for example and not in limitation) before a step of determining 300. Accordingly, such a step of waiting 500 can provide time for receiving a DKA command, which could toggle optional DKA check flag between true and false.

It will be apparent to one of ordinary skill in the art that the manner of making and using the claimed invention has been adequately disclosed in the above-written and attached description of the exemplary embodiments and aspects of the present invention.

It should be understood, however, that the invention is not necessarily limited to the specific embodiments, aspects, arrangement, steps, and components shown and described above, but may be susceptible to numerous variations within the scope of the invention. For example and not in limitation, the various logic aspects of the present invention can be implemented in any one or more of software, firmware, and hardwired logic circuitry, and additionally, processing can be distributed or centralized to any desired degree consistent with the present invention.

Therefore, the specification and drawings are to be regarded in an illustrative and enabling, rather than a restrictive, sense.

Accordingly, it will be understood that the above description of the embodiments of the present invention are susceptible to various modifications, changes, and adaptations, and the same are intended to be comprehended within the meaning and range of equivalents apparent to one of ordinary skill in the art.

Therefore, we claim:

1. A device controller interfaced between an electronic processing device and a sector-based data storage device having a plurality of sectors, said controller comprising:
   at least one processor communicatively connected to a clock and at least one computer memory having stored therein a control list including a security feature entry respectively including a target sector range, time data associated with the target sector range and representing a time window, and at least one security response associated with the target sector range, the target sector range being a subset of the plurality of sectors; and
   an event monitor, communicatively connected to said at least one processor and at least one of the clock and another clock, and including another processor and a data store containing at least one security alarm event associated with the target sector range;
   wherein said event monitor issues an alarm interrupt to said at least one processor when the other processor determines the security alarm event occurs based on at least one of environmental data provided by an environmental sensor communicatively connected to said event monitor, a clock time generated by the clock, and another clock time generated by the other clock, and upon receipt of the alarm interrupt, said at least one processor executes one or more of the at least one security response of the security feature associated with the target sector range after confirming a data keep alive check flag is true and when said at least one processor determines based, at least in part, on interrogation of the control list and a clock time generated by the clock, the time data of the security feature entry conflicts with the clock time when the clock time is beyond the time window.

2. The device controller of claim 1, wherein said event monitor is powered by a battery and said at least one processor is powered by the electronic processing device.

3. The device controller of claim 1, wherein the at least one security response of the entry includes at least one of a write access denial, a read access denial, an encryption of existing data within the target sector range, a deletion of the existing data within the target sector range, a wiping of the existing data within the target sector range, a relocation of the existing data within the target sector range to at least one of the data storage device and the at least one computer memory, and a storage in the at least one of the data storage device and the at least one computer memory of a log entry.

4. The device controller of claim 1, wherein the at least one security response of the entry includes at least two of a write access denial, a read access denial, an encryption of existing data within the target sector range, a deletion of the existing data within the target sector range, a wiping of the existing data within the target sector range, a relocation of the existing data within the target sector range to at least one of the data storage device and the at least one computer memory, and a storage in the at least one of the data storage device and the at least one computer memory of a log entry.

5. The device controller of claim 1, wherein the at least one security response of the entry includes at least three of a write access denial, a read access denial, an encryption of existing data within the target sector range, a deletion of the existing data within the target sector range, a wiping of the existing data within the target sector range, a relocation of the existing data within the target sector range to at least one of the data storage device and the at least one computer memory, and a storage in the at least one of the data storage device and the at least one computer memory of a log entry.

6. The device controller of claim 1, wherein said at least one processor requests the clock time from the clock in response to receipt, from said electronic processing device, of a processing request involving the storage device.

7. The device controller of claim 1, wherein said at least one processor determines, after a wait state, the time data conflicts with the clock time.

8. The device controller of claim 1, wherein said at least one processor determines the time data conflicts with the clock time in response to receipt, from said electronic processing device, of a processing request involving the storage device.

9. The device controller of claim 1, wherein the target sector range is a determinable sector range.

10. The device controller of claim 9, wherein the determinable sector range represents one of at least a portion of a file name, a time factor, a location factor, file content, and a file size.

11. A method of enforcing sector-based security by a device controller interfaced between an electronic processing device and a sector-based data storage device having a plurality of sectors, with the device controller having at least one processor communicatively connected to a clock and at least one computer memory having stored therein a control list including a security feature entry respectively including a target sector range, time data associated with the target sector range and representing a time window, and at least one security response associated with the target sector range, the target sector range being a subset of the plurality of sectors, and an event monitor, communicatively connected to the at least one processor and at least one of the clock and another clock, and including another processor and a data store containing at least one security alarm event associated with the target sector range, said method, comprising:

receiving, by the at least one processor, an alarm interrupt from the event monitor after the other processor determines the security alarm event occurs based on at least one of environmental data provided by an environmental sensor communicatively connected to the event monitor, a clock time generated by the clock, and another clock time generated by the other clock; and upon receipt of the alarm interrupt, executing by the at least one processor one or more of the at least one security response of the security feature associated with the target sector range when the at least one processor determines based, at least in part, on interrogation of the control list and the clock time, the time data of the security feature entry conflicts with the clock time when the clock time is beyond the time window and a data keep alive check flag is true.

12. The method of claim 10, wherein the event monitor is powered by a battery and the at least one processor is powered by the electronic processing device.

13. The method of claim 10, wherein the at least one security response of the entry includes at least one of a write access denial, a read access denial, an encryption of existing data within the target sector range, a deletion of the existing data within the target sector range, a wiping of the existing data within the target sector range, a relocation of the existing data within the target sector range to at least one of the data storage device and the at least one computer memory, and a storage in the at least one of the data storage device and the at least one computer memory of a log entry.

14. The method of claim 10, wherein the at least one security response of the entry includes at least two of a write access denial, a read access denial, an encryption of existing data within the target sector range, a deletion of the existing data within the target sector range, a wiping of the existing data within the target sector range, a relocation of the existing data within the target sector range to at least one of the data storage device and the at least one computer memory, and a storage in the at least one of the data storage device and the at least one computer memory of a log entry.

15. The method of claim 10, wherein the at least one security response of the entry includes at least three of a write access denial, a read access denial, an encryption of existing data within the target sector range, a deletion of the existing data within the target sector range, a wiping of the existing data within the target sector range, a relocation of the existing data within the target sector range to at least one of the data storage device and the at least one computer memory, and a storage in the at least one of the data storage device and the at least one computer memory of a log entry.

16. The method of claim 10, wherein in the step of executing the at least one processor requests the clock time from the clock in response to receipt, from the electronic processing device, of a processing request involving the storage device.

17. The method of claim 10, wherein in said step of executing, the at least one processor determines the time data conflicts with the clock time after a wait state.

18. The method of claim 10, wherein in said step of executing, the at least one processor determines the time data conflicts with the clock time in response to receipt, from the electronic processing device, of a processing request involving the storage device.

19. The method of claim 10, wherein the target sector range is a determinable sector range.

20. The method of claim 19, wherein the determinable sector range represents one of at least a portion of a file name, a time factor, a location factor, file content, and a file size.

* * * * *